US010428789B2

(12) United States Patent
Baun

(10) Patent No.: US 10,428,789 B2
(45) Date of Patent: Oct. 1, 2019

(54) CABLE ROUTING FOR WIND TURBINE SYSTEM HAVING MULTIPLE ROTORS

(71) Applicant: Vestas Wind Systems A/S, Aarhus N. (DK)

(72) Inventor: Torben Ladegaard Baun, Skødstrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 90 days.

(21) Appl. No.: 15/579,391

(22) PCT Filed: Jun. 9, 2016

(86) PCT No.: PCT/DK2016/050175
§ 371 (c)(1),
(2) Date: Dec. 4, 2017

(87) PCT Pub. No.: WO2017/008811
PCT Pub. Date: Jan. 19, 2017

(65) Prior Publication Data
US 2018/0355841 A1  Dec. 13, 2018

(30) Foreign Application Priority Data

Jul. 14, 2015  (DK) .......................... PA 2015 70462

(51) Int. Cl.
*F03D 1/02* (2006.01)
*F03D 80/80* (2016.01)
*H02G 11/02* (2006.01)

(52) U.S. Cl.
CPC ............... *F03D 1/02* (2013.01); *F03D 80/85* (2016.05); *F05B 2240/912* (2013.01);
(Continued)

(58) Field of Classification Search
CPC ....... F03D 1/02; F03D 80/85; F05B 2240/912
(Continued)

(56) References Cited

U.S. PATENT DOCUMENTS 2,106,557 A * 1/1938 Putnam ................. F03D 7/0224
290/44
4,110,631 A  8/1978 Salter
(Continued)

FOREIGN PATENT DOCUMENTS

EP  1483501 B1  9/2010
FR  2442353 A3  6/1980
(Continued)

OTHER PUBLICATIONS

NL 1029060 C2 (Windtechnology) Nov. 20, 2006—English Machine Translation (Year: 2006).*
(Continued)

*Primary Examiner* — Nathaniel E Wiehe
*Assistant Examiner* — David Whittaker
(74) *Attorney, Agent, or Firm* — Wood Herron & Evans LLP

(57) ABSTRACT

The present invention relates to a wind turbine system comprising a plurality of wind turbines mounted to a common support structure (4) by a support arm arrangement (10) comprising a mount portion (12) and at least one arm (13) extending from said mount portion and carrying a respective wind turbine (6). Said support arm arrangement (10) is capable of yawing around said support structure (4); and said wind turbine system comprises an improved arrangement for cable guiding in this connection.

13 Claims, 4 Drawing Sheets

(52) U.S. Cl.
CPC ...... *F05B 2240/9121* (2013.01); *H02G 11/02* (2013.01); *Y02E 10/728* (2013.01)

(58) Field of Classification Search
USPC .......................................................... 416/120
See application file for complete search history.

(56) References Cited

U.S. PATENT DOCUMENTS

| | | | | |
|---|---|---|---|---|
| 8,227,695 B2 * | 7/2012 | Ueno | ..................... | H02G 11/00 174/68.1 |
| 8,747,073 B2 * | 6/2014 | Ollgaard | .................. | B66D 1/36 416/244 A |
| 2012/0133144 A1 | 5/2012 | Barton et al. | | |

FOREIGN PATENT DOCUMENTS

| | | | | |
|---|---|---|---|---|
| NL | 1029060 C2 | 11/2006 | | |
| WO | 2010023160 A2 | 3/2010 | | |
| WO | WO-2015035965 A1 * | 3/2015 | ............... | F03D 1/04 |

OTHER PUBLICATIONS

European Patent Office, International Search Report and Written Opinion in PCT Application No. PCT/DK2016/050175, dated Sep. 16, 2016.
Danish Patent and Trademark Office, Search Report in PA 2015 70462, dated Feb. 9, 2016.

* cited by examiner

CABLE ROUTING FOR WIND TURBINE SYSTEM HAVING MULTIPLE ROTORS

TECHNICAL FIELD

The present invention generally relates to an improved cable routing for a wind turbine system having multiple rotors.

BACKGROUND TO THE INVENTION

The most common type of wind turbine is the three-bladed upwind horizontal-axis wind turbine (HAWT), in which the turbine rotor is at the front of the nacelle and facing the wind upstream of its supporting turbine tower.

There exist a number of alternative wind turbine designs. One example is the multi-rotor array type wind turbine.

EP1483501B1 discloses a multi-rotor array-type wind turbine in which a plurality of co-planar rotors is mounted to a common support structure. Such a configuration achieves economies of scale that can be obtained with a very large single rotor turbine, but avoids the associated drawbacks such as high blade mass, scaled up power electronic components and so on. However, although such a co-planer multi-rotor wind turbine has its advantages; it presents challenges to implement the concept in practice. The present invention is related to some of these problems.

SUMMARY OF THE INVENTION

The invention relates to a wind turbine system comprising a plurality of wind turbines mounted to a common support structure by a support arm arrangement, wherein said support arm arrangement comprising a mount portion and at least one arm extending from said mount portion and carrying a respective wind turbine. The support arm arrangement is capable of yawing around said support structure. Further the wind turbine system comprises an arrangement for cable guiding comprising at least one cable; an inner cable support structure, inside said support structure, configured to housing a plurality of windings of said cable; an outer cable support structure, outside said support structure, configured to housing a plurality of windings of said cable; and an opening in said support structure, adapted to guide said cable between said inner cable support structure and outer cable support structure during yawing of said support arm arrangement around said support structure.

With the present invention an advantageous solution has been found on how to ensure a good cable routing for a wind turbine system with multiple rotors.

BRIEF DESCRIPTION OF THE DRAWINGS

So that it may be more fully understood, the invention will now be described by way of example only to the following drawings, in which.

DETAILED DESCRIPTION OF EMBODIMENTS OF THE INVENTION

Figure 1:
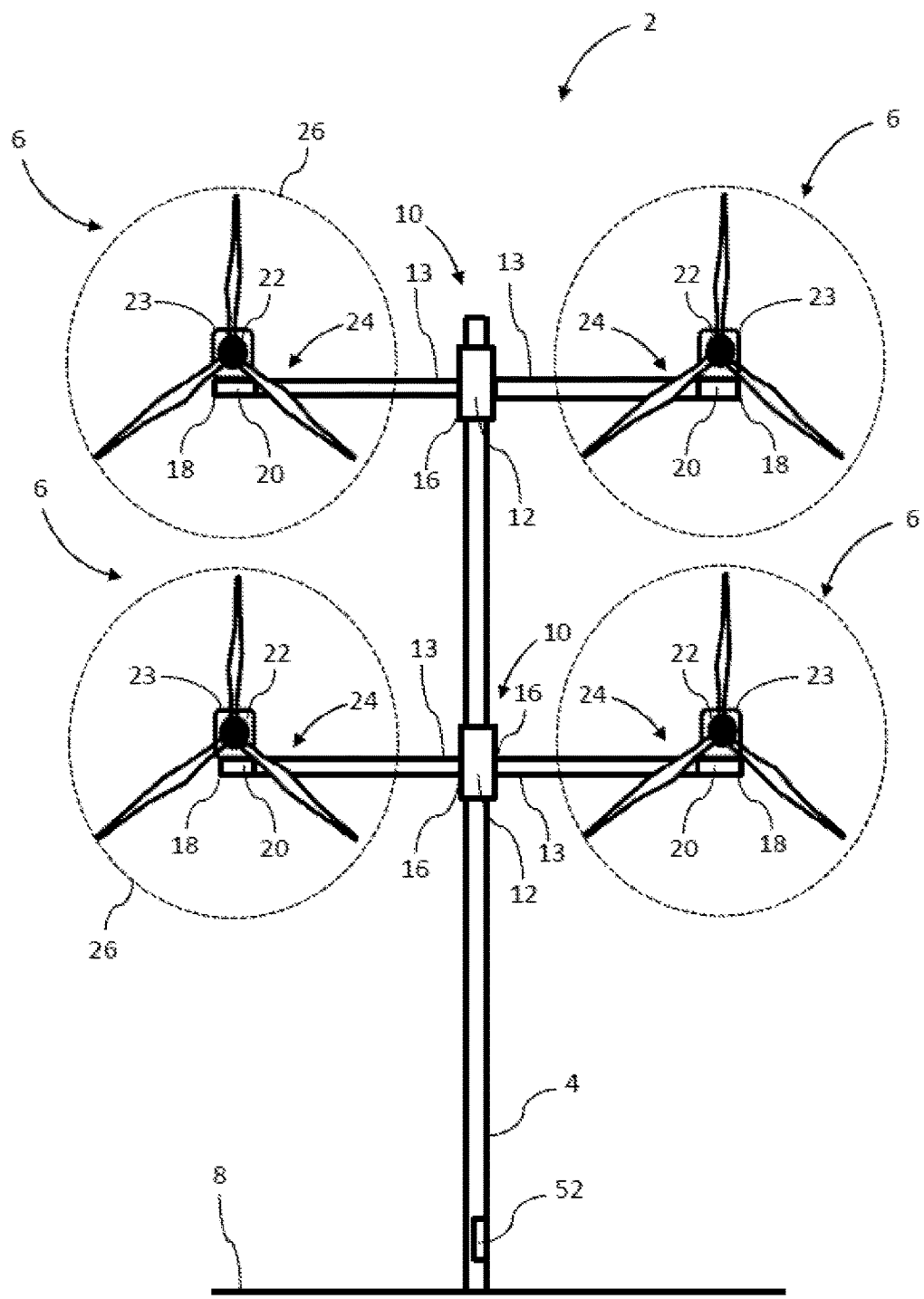
FIG. 1 is a front view of a multi-rotor wind turbine system.
Figure 2:
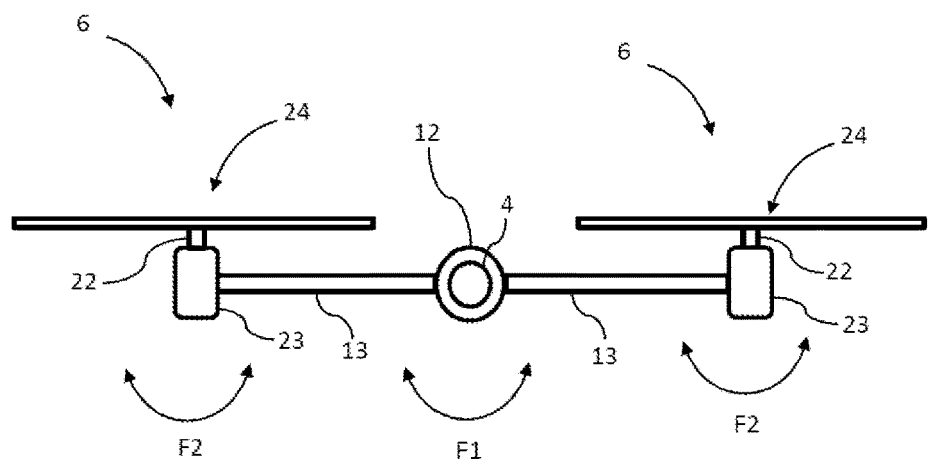
FIG. 2 is a top view of the multi-rotor wind turbine system in FIG. 1.

With reference to FIGS. 1 and 2, a wind turbine system 2 includes a support structure 4 on which is mounted a plurality of wind turbines 6. In this embodiment, the support structure 4 is a tower that is mounted on a foundation 8, as is typical with modern wind turbines systems, although it should be appreciated that other support structures are possible, for example frame-like structures. Note that the term 'wind turbine' is used here in the industry-accepted sense to refer mainly to the generating components with or without converter and/or transformer of the wind turbine system and as being separate to the support structure 4. Each of the plurality of wind turbines herein includes a rotor and a power generation system driven by the rotor. Note also that the foundation 8 may be a large mass, e.g. concrete or steel, embedded in the ground, or may be in the form of a monopole or jacket structure in an offshore wind turbine installation.

In this embodiment, there are four wind turbines 6, and these are mounted to the support structure 4 in two pairs, each pair including two wind turbines 6 that are mounted to the support structure 4 by a support arm arrangement 10.

Each of the two support arm arrangements 10 comprises a mount portion 12 and first and second arms 13 that extend from the mount portion and carry a respective wind turbine 6. As such, each of the support arms 13 includes an inner end 16 connected to the mount portion 12 and an outer end 18 that is connected to a wind turbine 6. Said support arms may comprise a beam and/or a grid structure and may be at least 20 m, such as at least 40 m or at least 60 m, in length from said inner end (16) to said outer end (18). If a grid structure is used, the cable may be routed in different directions along the grid structure. Further, the support arms may be strengthened by tension wires or tension stays.

Each of the two support arm arrangements 10 is mounted to the support structure 4 at the mount portion 12 so that the support arm arrangement 10 is able to yaw about the vertical axis of the support structure 4. A suitable yaw bearing and optionally gearing (not shown) will be provided for this purpose. This movement provides a first degree of freedom for the wind turbine 6 with respect to the support structure, as shown on FIG. 2 as 'F1'.

Furthermore, each wind turbine 6 may be able to yaw left and right with respect to the support arm 13 on which it is mounted. For this purpose, the wind turbines 6 may be mounted to their respective support arm 13 by a yaw unit 20. Mounting each of the wind turbines 6 on a yaw unit 20 provides a second degree of freedom for the wind turbines 6 with respect to the support structure 2, as shown on FIG. 2 by 'F2'. However, in a preferred embodiment, the wind turbines are rotationally fixed to their respective support arm and cannot yaw in relation to each other.

Each wind turbine 6 includes a rotor 22 that is rotatably mounted to a nacelle 23 in the usual way. The rotor 22 has a set of three blades 24 in this embodiment. Obviously the amount of yawing with the second degree of freedom will be limited by the distance between the blades 24 and the support arm 13. Three-bladed rotors are the most common rotor configuration, but different numbers of blades are also known. Thus, the wind turbines 6 are able to generate power from the flow of wind that passes through the swept area or 'rotor disc' 26 associated with the rotation of the blades.

FIGS. 1 and 2 show the main structural components of the wind turbine system 2 although the skilled person would understand that the illustrated embodiment has been simplified in order not to obscure the invention with unnecessary detail. One crucial thing left out in these figs. is the cables, such as the power cable. At least one power cable with one or more sub-cables must be drawn from a generator in each wind turbine, down to the ground to transfer the power. Generally, such cable may have a diameter of 60-110 mm. However, this power cable may not be the only cable extending from the wind turbine to the ground, but also other additional cables, such as signal cables or the like, may be extending in the same manner. Normally, these cables may be combined into one single cable and we will therefore only talk to one cable herein; however, this should not be considered limiting to the scope of the present invention. As such said cable may comprise at least 2 sub-cables, such as at least 3, 4, or 6.

For a standard wind turbine a known problem for cables leading from the generator to ground level is twisting during yawing. This problem may be dealt with in a number of different ways, known to the skilled person. Another problem comes up, though, when a multiple rotor wind turbine as shown in FIGS. 1 and 2 comes into play. Instead of just leading the cable from the nacelle down through the tower as in a standard wind turbine, for the multiple rotor wind turbine additional problems show up. Either a good way to lead the cable from the outside of the tower to the inside of the tower must be found or the power/signals must be transferred without using one single cable. One solution known to the skilled person is to use a slip ring system, which is however a very expensive solution for a size as high as a tower circumference. Some different ways to provide better solutions according to embodiments of the present invention will be explained with reference to FIGS. 3-5.

Figure 3:
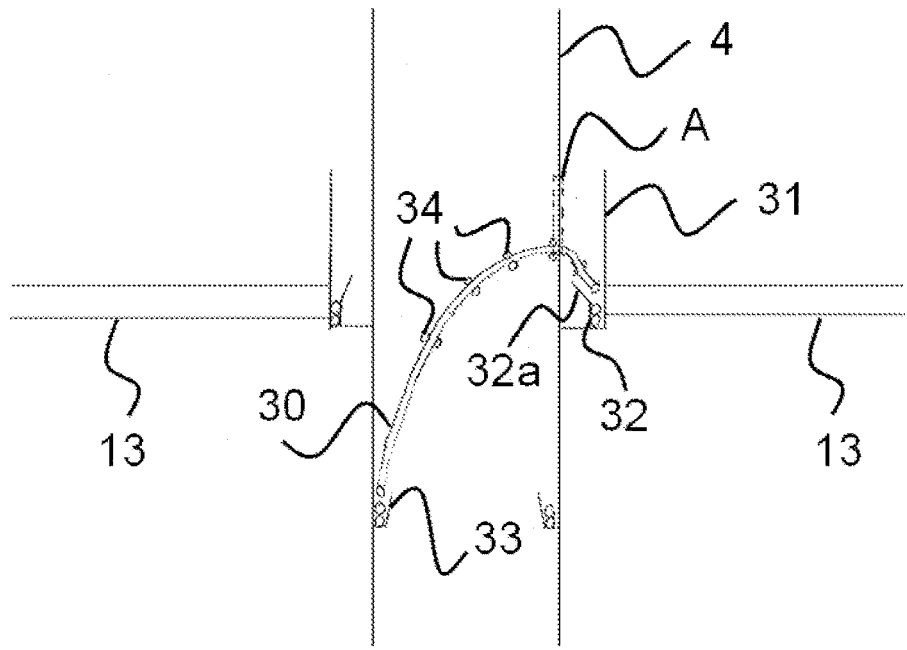
FIG. 3 is a front view of an embodiment according to the present invention.

FIG. 3 shows a close-up image of the area around the lower mount portion 12 in FIG. 1. The inner part of the support arms 13 are shown as well as part of the support structure 4. The full mount portion 12 is not shown in order to reveal important features inside of it. As part of the mount portion 12, an outer cable tray 31 is circumferentially positioned around the support structure 4 on the outer side and fixed to and thereby yawing together with the support arms 13. On the inner side of the support structure 4 and fixed thereto is a circumferential inner cable tray 33. In order to keep the cable a distance from the support structure 4 during yawing, an additional circumferential side wall 32 is used inside said outer cable tray 31. This side wall is shown here with an upper part being a circumferentially inwards inclined wall 32a, creating a funnel for collecting the cable during yawing. Hereby an improved collecting of the cable may be obtained. Such a funnel-shape may also be used for the inner cable tray 33 if desired.

As explained above, from each wind turbine at least one cable 30 runs (not shown) from the outer end 18 of each support arm 13. For the sake of clarity, we will here only focus on one cable from assuming the at least two cables are combined into one cable before or when entering the outer cable tray 31. How this can be done will be known to the skilled person in the art, e.g. a bus bar could be used. A cable 30 from the distal end of a support arm 13 enters the outer cable tray 31 easily since these are co-rotating. Two full windings of the cable 30 in the outer cable tray 31 are shown in FIG. 3; however this will vary dependent on the current yawing position. Likewise two full windings of the cable 30 in the inner cable tray 33 are shown in FIG. 3; from where the cable is led further down (not shown) in the support structure 4 in a manner well-known to the skilled person from conventional wind turbines.

In operation, support arm arrangement 10 including the support arms 13 are turned around the yaw bearing in order for the blades to be correctly oriented towards the wind. Through the use of the cable trays as described above, and leading the cable 30 through an opening 42 in the support structure 4, the cable 30 will either wind up in the inner or the outer cable tray, dependent on yawing direction, thereby winding off the other tray. If by example there are 5 full windings in both trays in an initial position, after two 360° turns of the support arm arrangement, one tray will have 7 full windings and the other will have 3 full windings, dependent on yawing direction. The combined number of windings in the two trays can be designed as desired, such as between 2 and 20 or between 5 and 15.

Figures 4, 5:
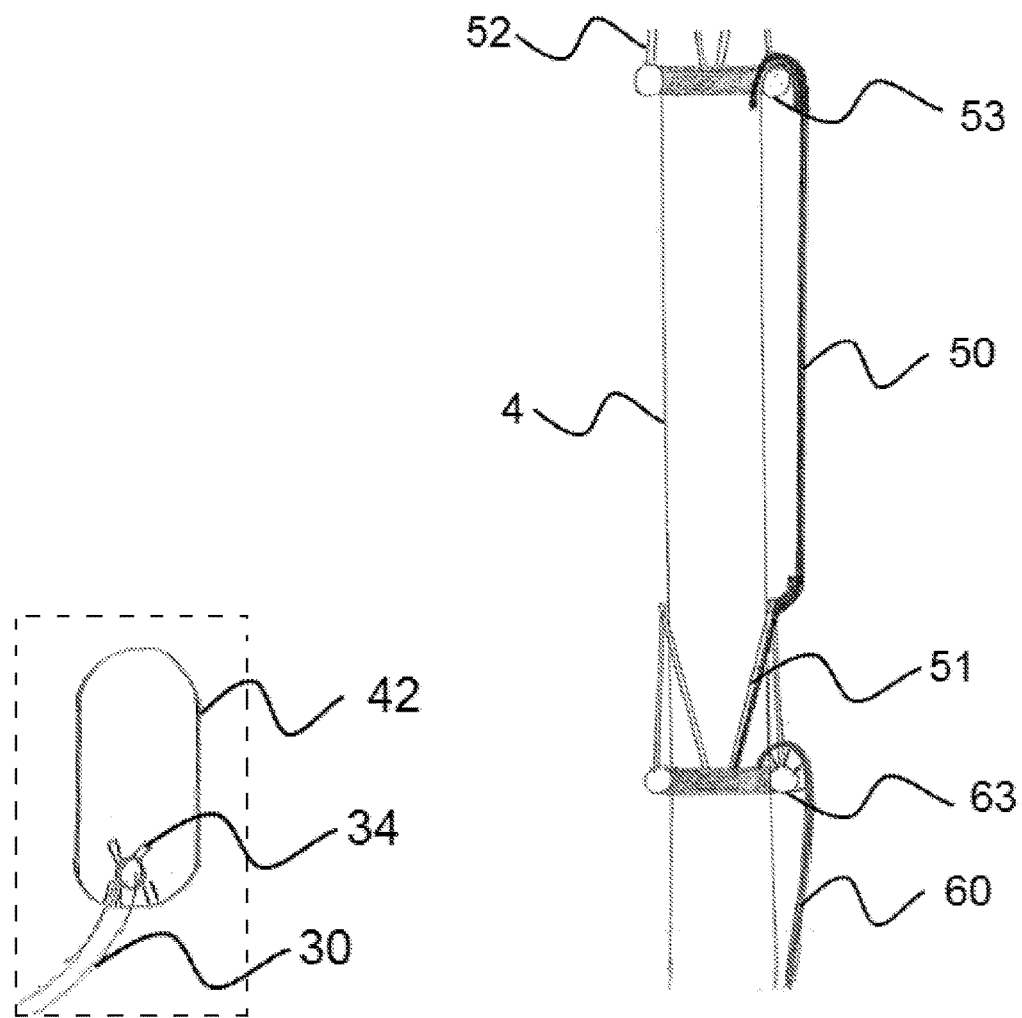
FIG. 4 is an enlarged view of the marking A in FIG. 3; seen from a 90° angled view compared to FIG. 3.
FIG. 5 discloses two different embodiments according to the present invention in one figure.

The opening 42 is seen more clearly in FIG. 4 showing a sideways view of FIG. 3, as marked with A in FIG. 3. At least the lower edge of this opening 42 may comprise a surface in or coated with a material suitable to allow the cable to slide with as little friction as possible, thereby not wearing the cable too much. A material for this may be for instance polytetrafluoroethylene (PTFE). Alternatively this lower edge may be a guiding bearing. Further, the cable 30 may be guided on the inner side of the tower as required by one or more guiding bearings 34, such as at least 2, 3 or 4. These guiding bearings may guide the cable e.g. along the inside wall or around obstacles inside the support structure 4. The opening 42 may be shaped in any desired shape allowing a cable to pass through. In further embodiments, more cables may be required to pass through and the opening may be shaped accordingly. It is believed to be advantageous to have the opening situated above the cable trays in order to make use of gravity to position the cable in the cable trays. Further, the lowest point of said opening 42 may be above the lowest point of said support arms 13.

For standard wind turbines, a typical number of allowed full rotations before returning to starting position is about 5. Likewise, the initial position and number of windings in the cable trays may be such that the support arms 13 may be allowed to be turned about five full turns before they must be re-turned to its original position in order to avoid any damages to the cables. However, clearly this may be designed as desired by adjusting the total number of windings in the individual cable trays from a starting point.

FIG. 5 shows a close-up image of the area around the upper and lower mount portions 12 in FIG. 1; the support structure 4 is shown. The full mount portions 12 are not shown in order to reveal important features inside of it. FIG. 5 shows two combined embodiments both solving the same problem as in FIGS. 3 and 4, namely how to lead a cable from the support arms 13, in particular the lower support arm, and down to the ground. For avoiding confusing, we will in the following label these two embodiments the upper embodiment and the lower embodiment.

Upper Embodiment

For the upper embodiment, the cable 50 is led from the lower support arm arrangement 51 via the grid structure of the support arm and then upwards vertically outside the support structure 4 till it reaches the upper support arm arrangement 52, where it is led over a circular element 53 of the upper support arm arrangement 52 and into the inside of the tower, from where it can be lead down to ground level according to well-known conventional wind turbine technology, known to the skilled person in the art.

In particular relevant to the upper embodiment, but not restricted hereto, it may be relevant to restrict the two support arm arrangements 10 in their yawing, such that one cannot deviate more than 120°, such as more than 90°, in relation to the other around the support structure. In the upper embodiment this is relevant in that it ensures that the free-hanging cable between the two support arm arrangements 10 is not forced against the support structure 4 and exposed to undesired forces.

Lower Embodiment

For the lower embodiment, the cable 60 is lead from the lower support arm arrangement 51 and downwards vertically outside the support structure 4; either to ground level or to a cable connecting means (not shown) adapted to catch the cable during yawing. Hereby this embodiment saves some cable length compared to the "upper embodiment". The cable connecting means may be positioned e.g. at least 3 m or at least 5 m above ground level. This may be embodied as a channel to catch the cable when yawing similar to the cable trays described in FIGS. 3 and 4. The cable may be led over a circular element 63 of the lower support arm arrangement 51.

The circular elements 53/63 are here indicated as a part of the grid structure as such, but they may also be in the form of a rotatable drum or a coating on the grid structure or on an additional layer on the grid structure. Corresponding embodiments may be used if the support arm is a beam instead of a grid structure. As a coating layer may be used the same solutions as for the opening with reference to FIGS. 3 and 4.

For any of the above embodiments, the power is transferred down towards the ground level, near the bottom of the support structure 4, and into electrical equipment such as a DC to AC converter, a transformer or a switch gear. If the cable transfers DC, it will typically be connected to a DC to AC converter; if the cable transfers AC, it will typically be connected to a transformer and/or switch gear. As such, the design opens for various designs. It is to be noted as well that said plurality of wind turbines may share at least one component among for instance a DC to AC converter, a transformer or a switch gear, thereby saving costs compared to 4 individual wind turbines in the conventional sense.

The electrical equipment may be positioned inside or outside the support structure as desired by the skilled person similar to well-known solutions for conventional wind turbines.

In both the upper and lower embodiment, the distance said cable is led vertically on the outside of said support structure may be a distance corresponding to at least half a rotor diameter. This may be at least 10 m, such as at least 20 m or at least 30 m.

Figure 6:
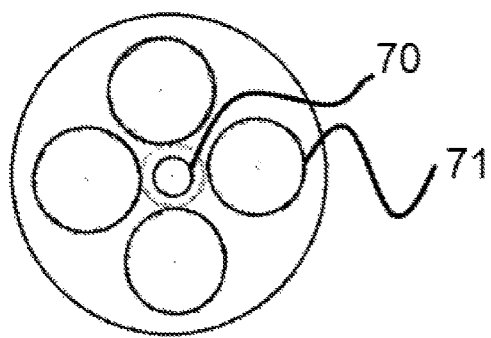
FIG. 6 discloses an embodiment of supporting cables useful in the embodiments in the above Figures, a side view and a top view in same Figure.
Figure 6:
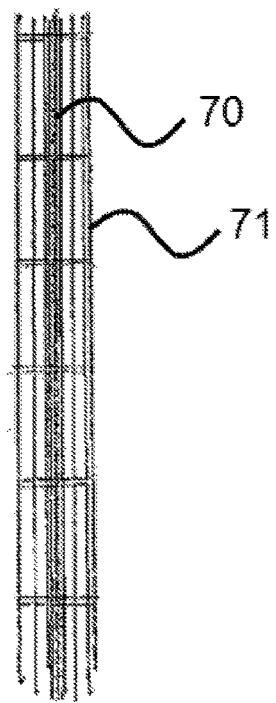

In the above, the cable has been discussed as one single cable for clarity reasons. In some embodiments, the cable comprises more than one sub-cables. FIG. 6 discloses an example of how such a combined cable may look. Here four sub-cables 71 are coupled onto a centre wire 70, in order for the wire 70 to carry the loads instead of the cables 71. This configuration may be surrounded partly or fully by a cover layer as known to the skilled person. As such, in embodiments of the invention, the one cable described above may be a combination of e.g. 4 sub-cables and at least one wire to carry the loads. To be able to see this configuration more clearly, both a side view and a top view is shown. Accordingly, in an embodiment of the invention said cable is supported by a wire; preferably a wire coaxial with said cable.

Figure 7:
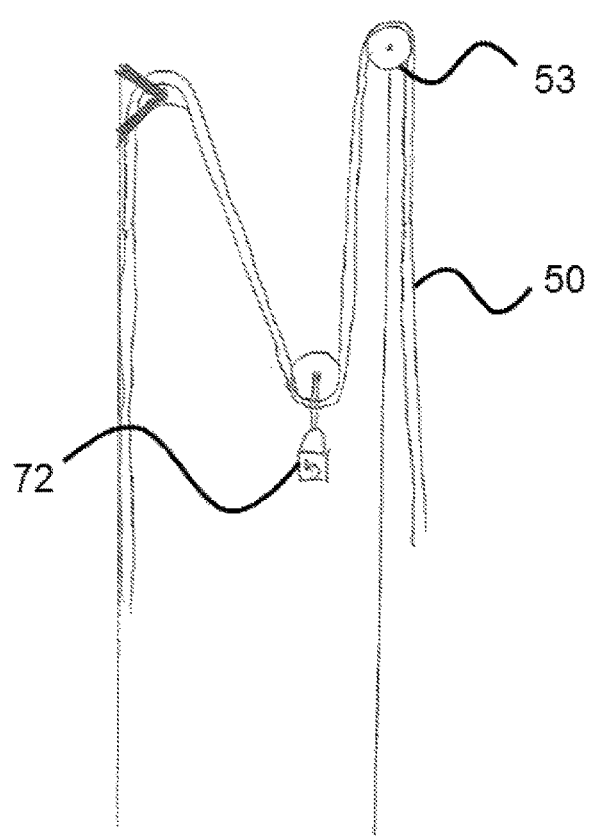
FIG. 7 discloses an embodiment of auto-adjusting cable length, in particular useful in the upper embodiment of FIG. 5.

For in particular the upper embodiment of FIG. 5 it may be useful to have a system for adjusting the cable length on the outside of the tower. FIG. 7 discloses an embodiment for such auto-adjusting of the cable length, where the cable 50 is led over a circular element 53 into the inside of the tower as described with respect to FIG. 5. Here the embodiment of FIG. 7 further shows that the cable is led via a length adjusting system, which for instance can be as simple as a counter-weight 72 mounted with a pulley as shown. Other suitable systems for auto-adjusting the cable length will be known to the skilled person. This means that when the two support arm arrangements do not yaw simultaneous (if e.g. one is out of order), additional cable length can be added to the outside of the tower, and the cable may simply wind up around the tower on the outside. This can be considered as an alternative to restricting the difference in yawing movement between the two support arm arrangements; however it is to be noted that both can work together according to further embodiments of the present invention.

The skilled person will appreciate that modifications may be made to the specific embodiments described above without departing from the inventive concept as defined by the claims.

Also, it should be appreciated that although the illustrated embodiment includes four wind turbines mounted to the support structure, this is to illustrate the principle of the proposed hierarchical control system which may be applied to wind turbine systems with more than four wind turbines. Moreover, embodiments are envisaged in which the wind turbines are not paired in groups of two, as in the illustrated embodiment, but are arranged differently and not necessarily having a co-planar relationship.

The invention claimed is:

1. A wind turbine system comprising a plurality of wind turbines mounted to a common support structure by a support arm arrangement;
    said support arm arrangement comprising a mount portion and at least one arm extending from said mount portion and carrying a respective wind turbine;
    said support arm arrangement being capable of yawing around said support structure;
    said wind turbine system further comprises an arrangement for power cable guiding comprising:
    at least one power cable;
    an inner power cable support structure, inside said support structure;
    an outer power cable support structure, outside said support structure, configured to housing a plurality of windings of said power cable;
    an opening in said support structure, adapted to guide said power cable between said inner power cable support structure and outer power cable support structure during yawing of said support arm arrangement around said support structure.

2. The wind turbine system according to claim 1, wherein said inner power cable support structure is fixed to said support structure.

3. The wind turbine system according to claim 1, wherein said outer power cable support structure is fixed to said support arm arrangement.

4. The wind turbine system according to claim 1, wherein said power cable is guided between said inner power cable support structure and said opening via at least one guiding bearing.

5. The wind turbine system according to claim 1, wherein said outer power cable support structure comprises a side wall with an upper part being a circumferentially inclined wall thereby creating a funnel for collecting the power cable during use.

6. The wind turbine system according to claim 1, wherein a lower edge of said opening comprises a coated surface to facilitate low friction sliding of said power cable.

7. The wind turbine system according to claim 6, wherein said coated surface comprises polytetrafluoroethylene (PTFE).

8. The wind turbine system according to claim 1, wherein a lower edge of said opening comprises a guiding bearing to facilitate sliding of said power cable.

9. The wind turbine system according to claim 1, wherein said wind turbine system comprises at least two support arm arrangements.

10. The wind turbine system according to claim 1, wherein said support arm arrangement comprises two arms extending from said mount portion; each carrying at least one respective wind turbine.

11. The wind turbine system according to claim 1, wherein said inner power cable support structure is configured to house a plurality of windings of said power cable.

12. The wind turbine system according to claim 11, wherein the combined number of windings in said inner power cable support structure and said outer power cable support structure is between 2 and 20.

13. The wind turbine system according to claim 12, wherein the combined number of windings in said inner power cable support structure and said outer power cable support structure is between 5 and 15.

* * * * *